(12) United States Patent
Lansford et al.

(10) Patent No.: US 6,937,158 B2
(45) Date of Patent: *Aug. 30, 2005

(54) METHOD AND APPARATUS FOR WIRELESS COMMUNICATION BETWEEN ELECTRONIC DEVICES

(75) Inventors: James L. Lansford, Stillwater, OK (US); Jon W. T. Inouye, Chandler, AZ (US); Debashis Chowdhury, Chandler, AZ (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/474,660

(22) Filed: Dec. 29, 1999

(65) Prior Publication Data

US 2003/0178984 A1 Sep. 25, 2003

(51) Int. Cl.$^7$ ............................................. G05B 19/02
(52) U.S. Cl. ................................................. 340/825.22
(58) Field of Search ..................... 340/825.03, 825.5, 340/7.34, 7.43, 2.1, 825.52, 925.73; 375/133, 134; 370/311, 342, 351, 329, 337, 480, 346, 347, 4.58, 278; 455/450, 426, 452.1, 507, 502

(56) References Cited

U.S. PATENT DOCUMENTS

| | | | | |
|---|---|---|---|---|
| 4,850,036 A | * | 7/1989 | Smith | 455/502 |
| 4,872,205 A | * | 10/1989 | Smith | 455/527 |
| 5,123,029 A | * | 6/1992 | Bantz et al. | 375/133 |
| 5,134,710 A | | 7/1992 | Akerberg | 455/54.1 |
| 5,241,542 A | * | 8/1993 | Natarajan et al. | 370/311 |
| 5,414,731 A | * | 5/1995 | Antunes et al. | 375/134 |
| 5,581,548 A | | 12/1996 | Ugland et al. | 370/330 |
| 5,818,828 A | * | 10/1998 | Packer et al. | 370/346 |
| 5,884,900 A | * | 3/1999 | van der Tuijn et al. | 370/342 |
| 5,887,022 A | | 3/1999 | Lee et al. | 375/202 |
| 6,519,460 B1 | * | 2/2003 | Haartsen | 455/452.1 |
| 6,600,726 B1 | * | 7/2003 | Nevo et al. | 370/278 |
| 6,683,886 B1 | * | 1/2004 | Eftimakis et al. | 370/458 |

* cited by examiner

*Primary Examiner*—Brian Zimmerman
*Assistant Examiner*—William Bangachon
(74) *Attorney, Agent, or Firm*—Blakely, Sokoloff, Taylor and Zafman

(57) ABSTRACT

A first device operates at a first hopping frequency during a first period of time and operates at a second hopping frequency during a second period of time. A second device operates at the first hopping frequency and communicates with the first device during the first period of time. A third device operates at the second hopping frequency and communicates with the first device during the second period of time. The second period of time may be a contention-free period during which time the second device may not communicate with the first device.

11 Claims, 4 Drawing Sheets

METHOD AND APPARATUS FOR WIRELESS COMMUNICATION BETWEEN ELECTRONIC DEVICES

The present invention relates to communication systems and more particularly to wireless communication between two devices that may operate on different frequency hopping protocols.

BACKGROUND

Electronic devices typically include one or more semiconductor chips that manipulate and control the flow of data by executing instructions that are either entered by a user or read from a temporary, semi-permanent, or permanent storage area. These semiconductor chips are called processors. As the integration density of these processors increases, and the associated costs decrease, electronic devices will become increasingly pervasive in our society. Electronic devices include cellular and cordless phones, audio and video devices such as CD, DVD, and VCR units, cable boxes, automobile accessories such as global positioning systems, and other types of computer systems from small handheld personal data assistants (PDAs), to notebook systems, to large workstations and servers.

Currently these electronic devices tend to operate on different communication protocols, making it difficult for one electronic device to communicate with another. One reason why it might be found to be beneficial to have two different electronic devices communicate with one another is to quickly exchange data. For example, suppose a user has an address book electronically stored in a computer system, and the user wants to download the address book to their cellular phone so that names and numbers can be quickly called up and dialed from the phone. If the computer system cannot communicate with the cellular phone, the user may need to resort to entering each name and number from their address book into their cellular phone by hand.

The present invention addresses this and other problems associated with the prior art.

SUMMARY OF THE INVENTION

In accordance with one embodiment of the present invention, a first device operates at a first hopping frequency during a first period of time and operates at a second hopping frequency during a second period of time. A second device operates at the first hopping frequency and communicates with the first device during the first period of time. A third device operates at the second hopping frequency and communicates with the first device during the second period of time.

Other features and advantages of the present invention will be apparent from the accompanying figures and the detailed description that follows.

BRIEF DESCRIPTION OF THE DRAWINGS

The present invention is illustrated by way of example and not limitation in the accompanying figures in which like references indicate similar elements and in which.

DETAILED DESCRIPTION

In accordance with an embodiment of the present invention, an electronic device is capable of operating at two different hopping frequencies. This electronic device is referred to herein as a "controller." Operation at the first hopping frequency allows wireless communication between the controller and a first class of electronic devices in accordance with a first wireless communication protocol. Operation at the second hopping frequency allows wireless communication between the controller and a second class of electronic devices in accordance with a second wireless communication protocol. The first wireless communication protocol includes provisions to define a contention-free period during which time the first class of electronic devices do not communicate with the controller.

Initially, the controller operates at the first hopping frequency in accordance with the first wireless communication protocol, and communicates with a first electronic device belonging to the first class of electronic devices. The controller detects the presence of a second electronic device belonging to the second class of electronic devices. The controller then determines a time frame for a contention-free period and indicates this time frame to the first device.

During the contention-free period, the first device ceases communication with the controller, and the controller operates at the second hopping frequency in accordance with the second wireless communication protocol. Communication between the controller and the second electronic device takes place. During this communication, data may be exchanged between the controller and the second electronic device, including an indication of the time frame for the next contention-free period.

After the contention-free period has ended, the controller again operates at the first hopping frequency in accordance with the first wireless communication protocol, and communicates with a first electronic device. This communication may continue until the next contention-free period.

In accordance with one embodiment of the present invention, the first wireless communication protocol may be the HomeRF* protocol described in the Shared Wireless Access Protocol (SWAP) Specification 1.0, released Jan. 5, 1999. The second wireless communication protocol may be the Bluetooth* protocol described in the Bluetooth Specification, Version 1.0A, released Jul. 24, 1999. Other communication protocols may be used, however. (*Trademarks and brands are the property of their respective owners.)

A more detailed description of embodiments of the present invention, including various configurations and implementations, is provided below.

Figure 1:
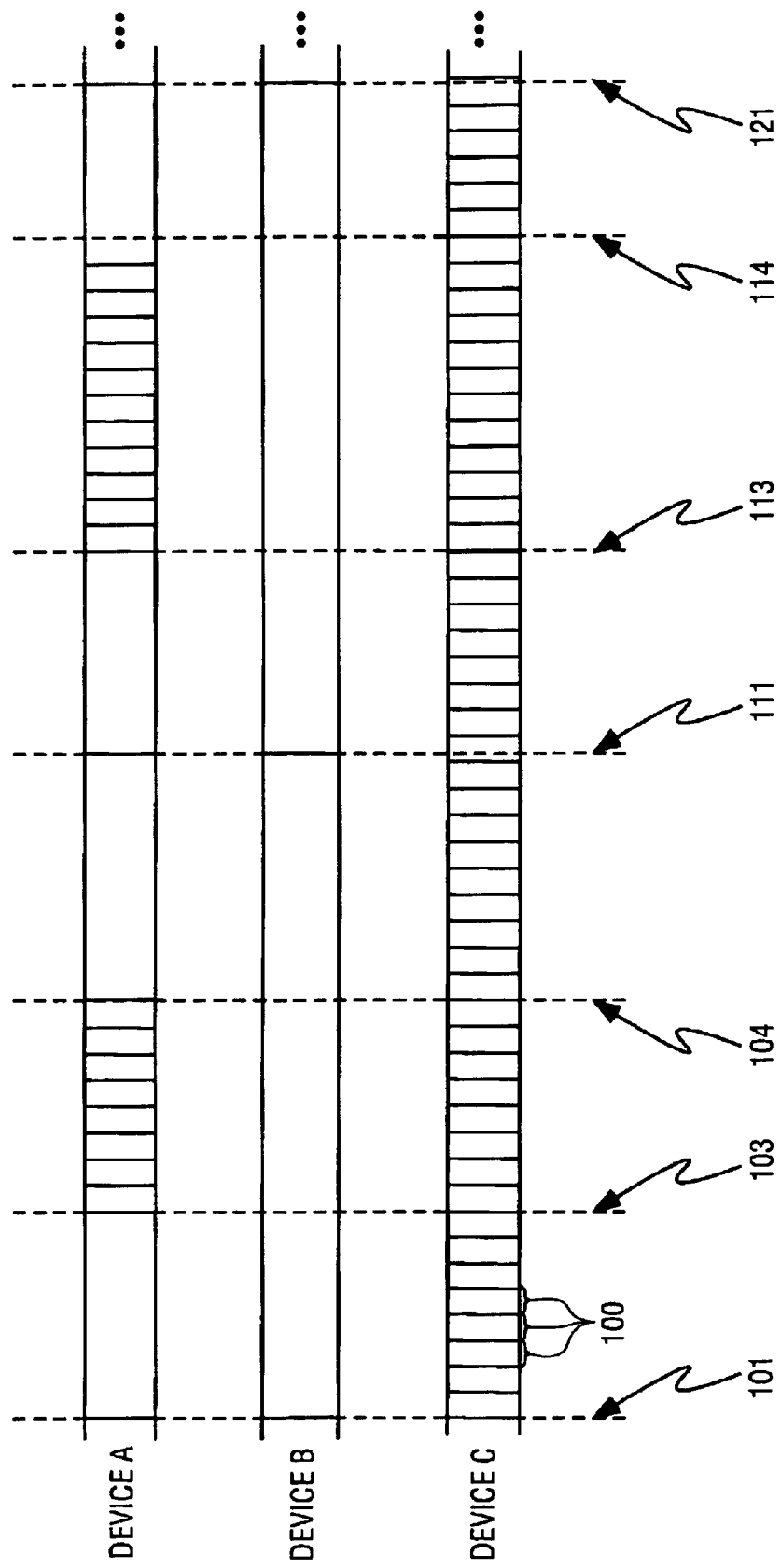
FIG. 1 shows how three devices may communicate with each other using two different communication protocols in accordance with an embodiment of the present invention.

FIG. 1 shows how three devices may communicate with each other using two different communication protocols in accordance with an embodiment of the present invention. Time progresses from left to right in FIG. 1. Solid vertical lines represent frequency hops and dashed vertical lines are used to mark points in time to clarify the discussion below.

As used herein, a "block" is the period of time between frequency hops in accordance with a communication protocol. For example, Device B, of FIG. 1, operates in accordance with a first protocol in which a single block lasts from time 101 to 111, and another block lasts from 111 to 121. Device C, of FIG. 1, operates in accordance with a second protocol in which a block lasts for a much shorter period of time. Three blocks in accordance with the second protocol are labeled 100 in FIG. 1. Various frequency hopping communication protocols may use alternate terms to refer to a block, such as frame, superframe, slot, or segment.

As used herein, a "hopping frequency" is the rate at which a device hops from one frequency to another in accordance with a communication protocol. As used herein, a "block frequency" is the operating frequency at which a device communicates within a block in accordance with a communication protocol. For example, HomeRF devices (i.e. devices able to communicate in accordance with the HomeRF communication protocol) operate at a hopping frequency of 50 hops per second, meaning each block lasts 20 ms. Bluetooth devices (i.e. devices able to communicate in accordance with the Bluetooth communication protocol) operate at a hopping frequency of 1600 hops per second, meaning each block lasts 0.625 ms. In accordance with both the HomeRF and Bluetooth protocols, each block frequency is in the vicinity of 2.4 GHz.

Referring again to FIG. 1, a first electronic device, Device A, is capable of operating at a first hopping frequency in accordance with a first communication protocol during a first period of time, and at a second hopping frequency in accordance with a second communication protocol during a second period of time. During a first block bounded by times 101 and 111, Devices A and B operate at the same block frequency and may communicate with each other according to the first communication protocol. At time 111, both Devices A and B hop to the next block frequency in accordance with the first communication protocol. Then, during a second block bounded by times 111 and 121, Devices A and B operate at the same block frequency and may communicate with each other according to the first communication protocol.

Within the first block of the first communication protocol, bounded by times 101 and 111 of FIG. 1, Device A switches to a second hopping frequency in accordance with the second communication protocol. During the period of time bounded by times 103 and 104, Devices A and C operate at the same hopping and block frequencies, and these devices may communicate with each other according to the second communication protocol. Within the next block of the first communication protocol, bounded by times 111 and 121 of FIG. 1, Device A again switches to the second hopping frequency in accordance with the second communication protocol. During the period of time bounded by times 113 and 114, Devices A and C again operate at the same hopping and block frequencies, and these devices may communicate with each other according to the second communication protocol.

Note that in accordance with one embodiment of the present invention, Device A may be capable of switching to any number of hopping frequencies and block frequencies to communicate with electronic devices in accordance with any number of communication protocols. In addition, for one embodiment, Device A may communicate with another electronic device that is also capable of switching to different hopping and block frequencies in accordance with different communication protocols. For this embodiment, the electronic devices may determine the proper protocol with which to communicate based on the particular electromagnetic environment in which the communication occurs, the type of data to be communicated between the devices, or based on user input.

In accordance with an embodiment of the present invention, coordination of communication between the electronic devices of FIG. 1 may be controlled by Device A. For this reason, Device A may be referred to as a controller. For an embodiment of the present invention in which Device B is a HomeRF device and Device C is a Bluetooth device, Device A may be referred to as a connection point or master.

Devices A, B, and C may each include a receiver, a processor, and a transmitter. In accordance with one embodiment of the present invention, the same antenna may be used for both reception by a receiver and transmission by a transmitter. The processor may be used to process the signals received and sent. Examples of electronic devices that may be used to implement embodiments of the present invention are provided below in conjunction with FIGS. 2 and 3.

Device A, as the controller, listens for and receives a signal from Device C of FIG. 1. This signal requests communication between Devices A and C and may be spontaneously sent from Device C (e.g. in regular, predetermined intervals) or it may be sent in response to an initiating signal from Device A. This initiating signal may be occasionally sent from Device A to detect the presence of electronic devices with which to communicate. Note that for an embodiment in which Device C is a Bluetooth device, the signal from Device C requesting communication with Device A may be referred to as an inquiry.

After Device A of FIG. 1 receives the signal from Device C requesting communication, Device A, as the controller, determines a time frame for a contention-free period. This determination may be made based on information contained in the signal received from Device C, the available bandwidth, and the communication protocols. For example, if Device C indicates that it requires lengthy communication as soon as possible with Device A, Device A may allocate more time for the contention-free period sooner after receiving the signal from Device C. If, however, Devices A and B are already engaged in communication of a large amount of data, then Device A may postpone or shorten the contention-free period.

Once determined, Device A of FIG. 1 sends a signal to Device B indicating the time frame for the contention-free period. This signal may be sent during the period of time bounded by time 101 and 103, during which time Device A is operating according to the same communication protocol as Device B. In accordance with an embodiment in which this communication protocol is HomeRF, the signal sent from Device A to Device B indicating the time frame for the contention-free period may be referred to as a beacon.

According to FIG. 1, the time frame for the first contention-free period begins at time 103 and ends at time 104. During this contention-free period, communication between Device A and Device B is suspended. For one embodiment of the present invention, Device B, after receiving the signal from Device A indicating the time frame for the contention-free period, does not attempt to contend for communication with Device A during that period.

In accordance with various communication protocols, a contention-free period may alternatively be referred to as a time reservation or bandwidth reservation period. Provisions for establishing a contention-free period have been designed into wireless communication protocols, such as HomeRF, to provide guaranteed bandwidth to electronic devices that require time-critical communication, such as cordless phones. In accordance with an embodiment of the present invention, these provisions may be used to reserve a time period during which electronic devices may communicate using alternate communication protocols.

At time 103 of FIG. 1, both Device A and Device C hop to the same block frequency and begin the process of establishing a communication link between the devices. For an embodiment in which Device C is a Bluetooth device that communicates with Device A during the contention-free period in accordance with the Bluetooth communication protocol, this process of establishing a communication link may be referred to as paging. In addition, for this embodiment, Device A establishes itself as the master device and Device C operates as the slave.

As shown in FIG. 1, during the contention-free period from time 103 to 104, Devices A and C communicate with each other over the course of eight frames in accordance with the same frequency hopping communication protocol. During this time, Device A may send a signal to Device C indicating the time frame and initial block frequency for the start of the next contention-free period at time 113. Device C may then wait until time 113 before re-establishing communication with Device A.

At time 104 of FIG. 1, Device A hops back to the block frequency at which Device B is operating, again allowing Devices A and B to communicate with each other according to their mutual communication protocol. Both Devices A and B hop to the next block frequency at time 111, and the process continues in the manner described above. For example, Devices A and B may communication according to a first communication protocol within the block during the period of time outside the contention-free period. That is from time 111 to 113 and from time 114 to 121. The time period from 113 to 114 is reserved as the contention free period during which time Device B halts communication with Device A, and Devices A and C communicate according to a second communication protocol over the course of twelve blocks.

Figure 2:
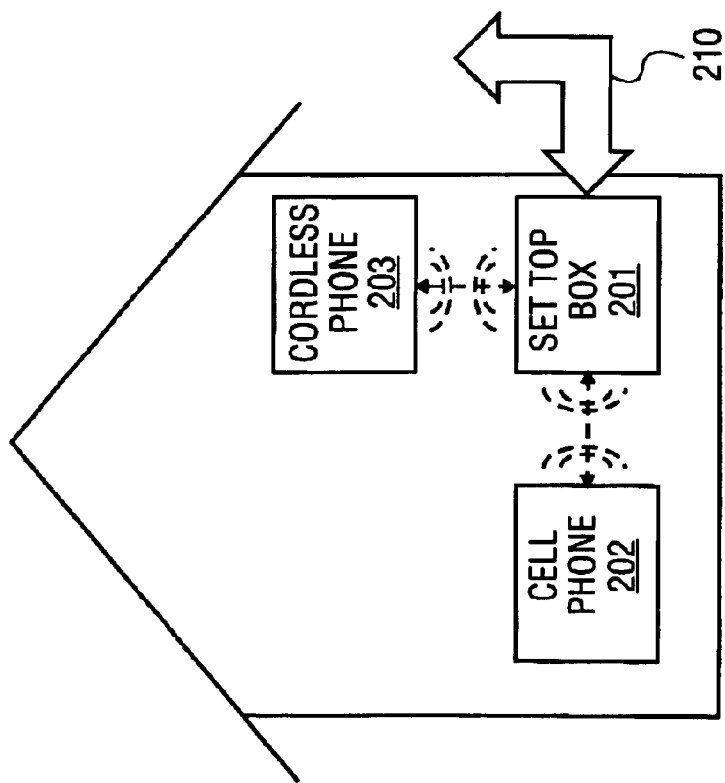
FIG. 2 shows one implementation of the present invention in the home.

For one embodiment of the present invention, Devices A, B, and C of FIG. 1 may be any type of electronic device including, for example, a cell phone, cordless phone, set top box, desktop or mobile computer, automobile, etc. For example, FIG. 2 shows one implementation of the present invention in the home. Set top box 201 is coupled to a cable 210 that provides high bandwidth communication with a local cable provider. Set top box 201 may wirelessly communicate with cordless phone 203 according to a first communication protocol operating at a first hopping frequency. Set top box 201 may simultaneously wirelessly communicate with cell phone 202 according to a second communication protocol operating at a second hopping frequency according to the method described above.

For the example of FIG. 2, set top box 201 acts as the controller (e.g., Device A of FIG. 1). In accordance with this example, a user may be able to talk on cordless phone 203 while downloading data from set top box 201 to cell phone 202. This data may include, for example, an electronic address book or email.

Figure 3:
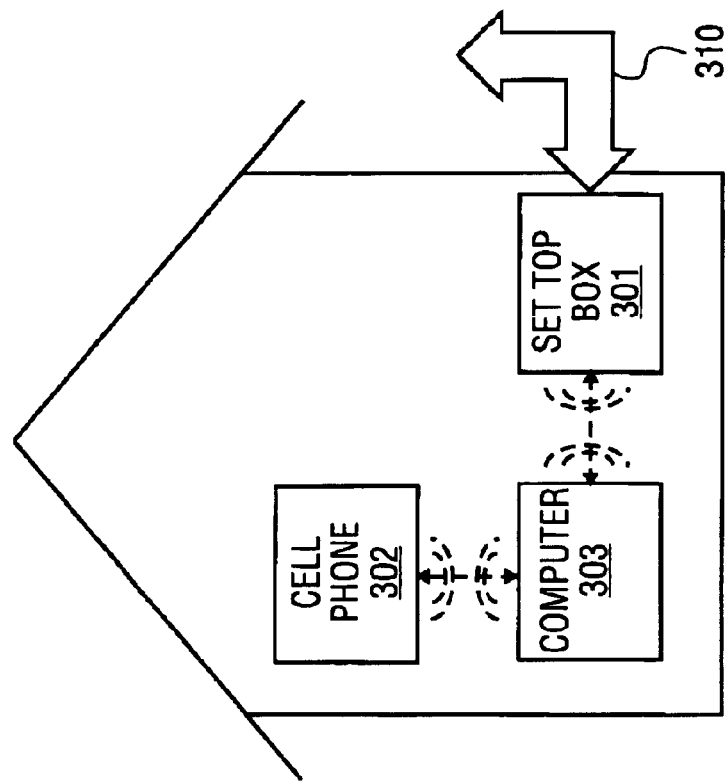
FIG. 3 shows another implementation of the present invention in the home.

As another example, FIG. 3 shows another implementation of the present invention in the home. Set top box 301 is coupled to a cable 310 that provides high bandwidth communication with a local cable provider. Set top box 301 may wirelessly communicate with computer 303 according to a first communication protocol operating at a first hopping frequency. Computer 303 may simultaneously wirelessly communicate with cell phone 302 according to a second communication protocol operating at a second hopping frequency according to the method described above.

For the example of FIG. 3, computer 303 acts as the controller (e.g., Device A of FIG. 1). In accordance with this example, a user may be able to surf the internet from computer 303 using set top box 301 as a cable modem while downloading data from computer 303 to cell phone 302. This data may include, for example, an electronic address book or email.

Figure 4:
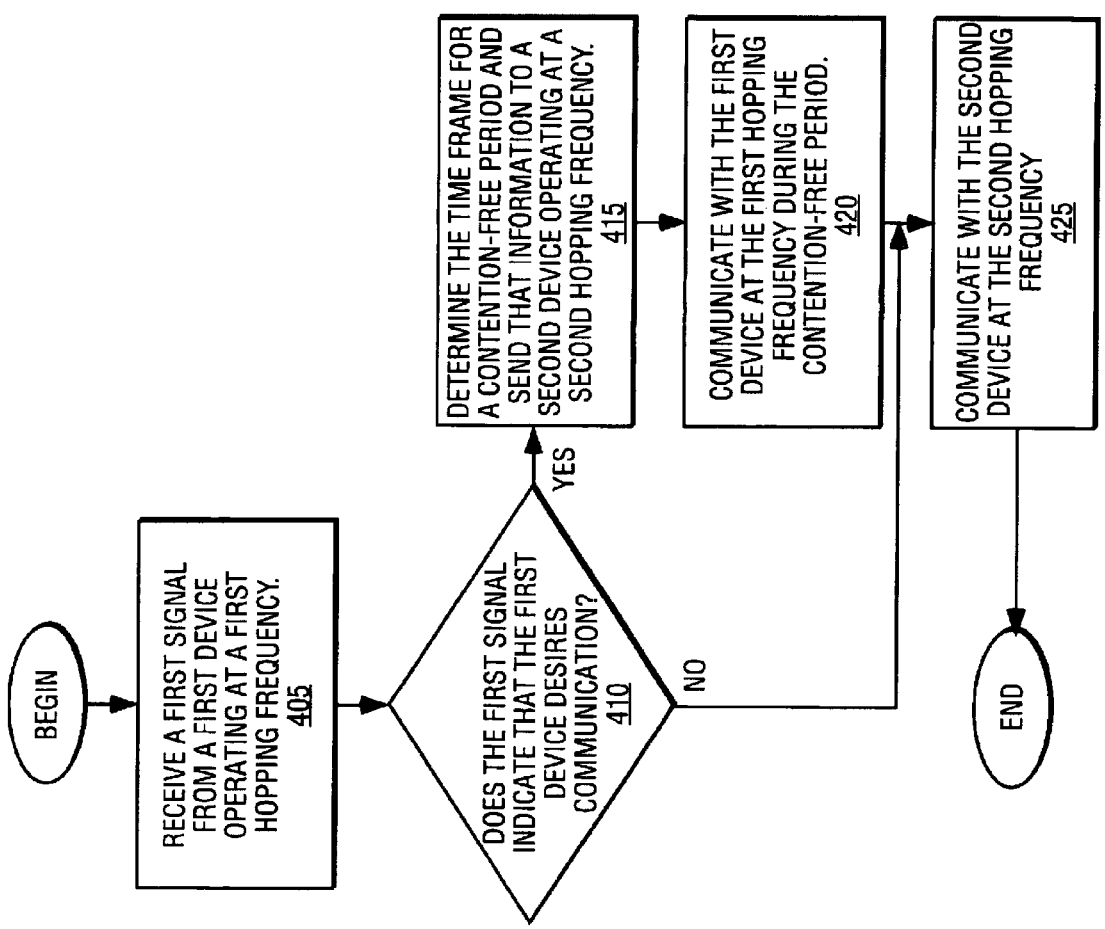
FIG. 4 is a method of the present invention.
Figure 5:
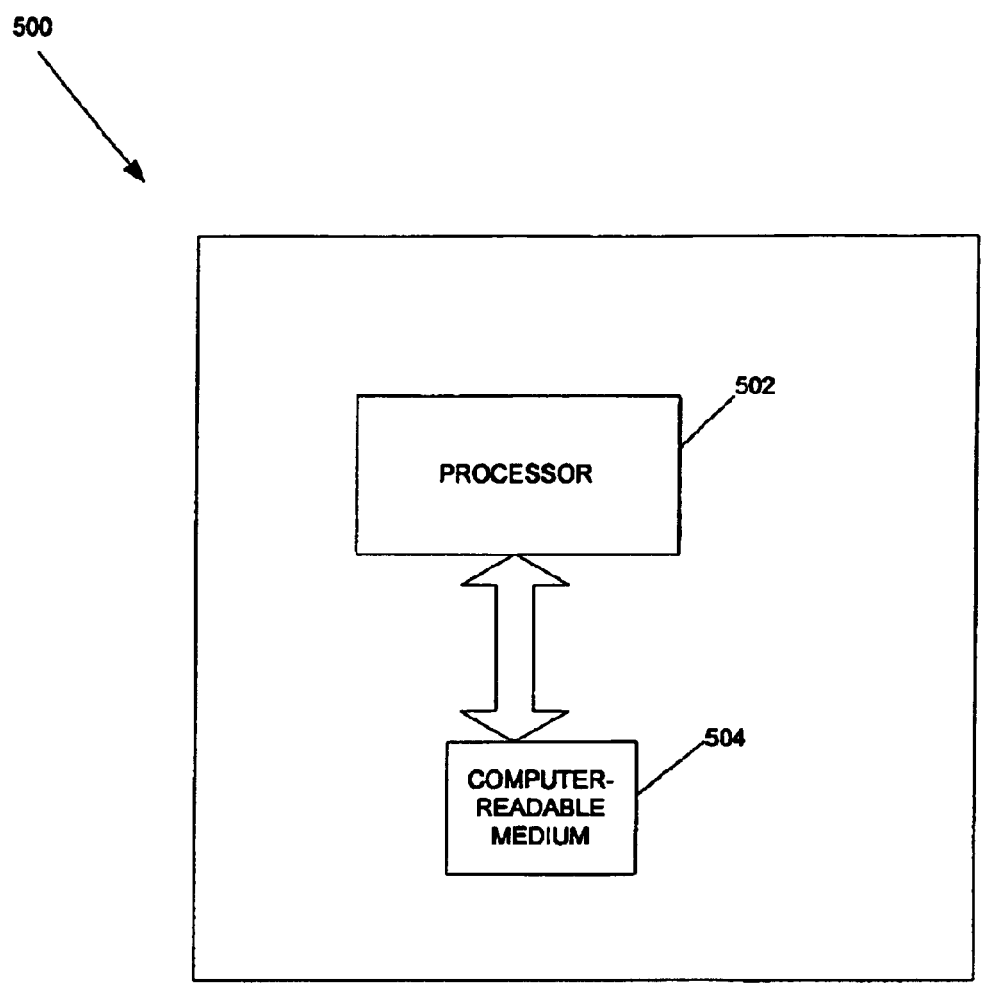
FIG. 5 shows a high-level block diagram of a HomeRF connection point (CP) unit, in accordance with one embodiment of the invention.

FIG. 4 is a method of the present invention as implemented from the perspective of the controller communicating with a second device at a second hopping frequency when a first device operating at a first hopping frequency is detected in the wireless network. FIG. 4 describes the steps that may be taken at each block of the slower hopping frequency (which is the second hopping frequency in the example of FIG. 4). Note that the method of FIG. 4 may be implemented by a computer system programmed to execute the steps of the method. Such a program may reside on any computer readable medium such as a magnetic disk (e.g. a hard drive or floppy), an optical disk (e.g. a CD or DVD), or a semiconductor device (e.g. Flash, EPROM, or RAM). An example of a computer system defining a HomeRF connection point (CP) unit, in accordance with one embodiment of the invention is shown in FIG. 5 of the drawings. Refering to FIG. 5 it will be seen that the HomeRF connection point (CP) unit includes a processor 500 and a computer readable medium 502 which is coupled to the processor 500. The computer readable medium 502 stores the program to enable the HomeRF connection point (CP) unit to perform the method described with reference to FIG. 4.

At step 405 of FIG. 4 a first signal is received from a first electronic device operating at a first hopping frequency. At step 410 it is determined whether or not the first signal indicates that the first device desires communication with the controller. If communication is not desired, or communication is not possible or convenient, then the second device communicates with the controller at the second hopping frequency at step 425 If, however, the first signal indicates that communication between the first electronic device and the controller is desired, then the method proceeds to step 415.

At step 415 of FIG. 4, a time frame for a contention-free period is determined. The information containing this time frame is sent to a second electronic device operating at a second hopping frequency to indicate the contention-free period to the second device. During the contention-free period at step 420, the first device communicates with the controller at the first hopping frequency, and outside the contention-free period at step 425, the second device communicates with the controller at the second hopping frequency.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A method comprising:
    a HomeRF connection paint (CP) unit establishing a connection with a HomeRF unit;
    the HomeRF CP unit establishing a connection with a Bluetooth unit as a slave to the HomeRF CP unit as a master;
    the HomeRF CP unit determining a contention free period, during which the HomeRF CP unit and the HomeRF do not transfer data;

the HomeRF CP unit communicating the contention free period to the Bluetooth unit, the Bluetooth unit to wake from a suspended state at the time of the contention free period;

transmitting data between the HomeRF CP unit and the HomeRF unit;

during the contention free period, the HomeRF CP unit ceasing transmission of data to the HomeRF unit and transitioning from a first hopping frequency to a higher second frequency hopping and transmitting data between the HomeRF CP unit and the Bluetooth unit;

at an end of the contention free period, the HomeRF CP unit transmitting a next contention free period to the Bluetooth unit, ceasing transmission of data to the Bluetooth unit and transitioning from the second hopping frequency to the first frequency hopping and transmitting data between the HomeRF CP unit and the HomeRF unit until the next contention free period.

2. The method of claim 1, wherein the transmitting data between the HomeRF CP unit and the Bluetooth unit includes transmitting data for a number of a Bluetooth slots corresponding with the contention free period.

3. The method of claim 1, wherein the transmitting data between the HomeRF CP unit and the Bluetooth unit includes transmitting data in an Asynchronous Connection-Less packet format.

4. The method of claim 1, further comprising the HomeRF CP unit and the Bluetooth unit operating independently during a time outside of contention free period.

5. A computer readable medium having stored thereon a set of instructions that, when executed, perform a method comprising of:

a HomeRF connection point (CP) unit establishing a connection with a HomeRF unit;

the HomeRF CP unit establishing a connection with a Bluetooth unit as a slave to the HomeRF CP unit as a master;

the HomeRF CP unit determining a contention free period during the period the HomeRF CP unit and the HomeRF unit do not transfer data;

the HomeRF CP unit communicating the contention free period to the Bluetooth unit, the Bluetooth unit to wake from a suspended state at the time of the contention free period;

transmitting data between the HomeRF CP unit and the HomeRF unit;

during the contention free period, the HomeRF CP unit ceasing transmission of data to the HomeRF unit and transitioning from a first hopping frequency to a higher second frequency hopping and transmitting data between the HomeRF CP unit and the Bluetooth unit; and at an end of the IOP, the HomeRF CP unit transmitting a next IOP to the Bluetooth unit, ceasing transmission of data to the Bluetooth unit and transitioning from the second hopping frequency to the first frequency hopping and transmitting data between the HomeRF CP unit and the HomeRF unit until the next IOP.

6. The computer readable medium of claim 5, wherein the transmitting data between the HomeRF CP unit and the Bluetooth unit includes transmitting data for a number of a Bluetooth slots corresponding with the IOP.

7. The computer readable medium of claim 5, wherein the transmitting data between the HomeRF CP unit and the Bluetooth unit includes transmitting data in an Asynchronous Connection-Less packet format.

8. The computer readable medium of claim 5, further comprising the HomeRF CP unit and the Bluetooth unit operating independently during a time outside of an IOP.

9. A HomeRF connection point (CP) unit comprising:

a processor; and a computer readable medium coupled to the processor to store a program which when executed by the processor causes the HomeRF connection point (CP) unit to perform a method comprising:

establishing a connection with a HomeRF unit, and establishing a connection with a Bluetooth unit as a slave to the HomeRF CP unit as a master;

determining a contention free period, during the period the HomeRF CP unit and the HomeRF unit do not transfer data;

communicating the contention free period to the Bluetooth unit, the Bluetooth unit to wake from a suspended state at the time of the contention free period;

transmitting data between the HomeRF CP unit and the HomeRF unit;

at a time of the contention free period, ceasing transmission of data to the HomeRF unit and transitioning from a first hopping frequency to a higher second frequency hopping and beginning to transmit data between the HomeRF CP unit and the Bluetooth unit; and at an end of the contention free period, to transmitting a next contention free period to the Bluetooth unit, ceasing transmission of data to the Bluetooth unit and transitioning from the second hopping frequency to the first frequency hopping and beginning to transmit data between the HomeRF CP unit and the HomeRF unit until the next contention free period.

10. The unit of claim 9, wherein the transmitting data between the HomeRF CP unit and the Bluetooth unit includes transmitting data for a number of a Bluetooth slots corresponding with the contention free period.

11. The unit of claim 9, wherein the transmitting data between the HomeRF CP unit and the Bluetooth unit includes transmitting data in an Asynchronous Connection-Less packet format.

* * * * *